(12) United States Patent
Ogasawara

(10) Patent No.: US 11,587,283 B2
(45) Date of Patent: Feb. 21, 2023

(54) IMAGE PROCESSING APPARATUS, IMAGE PROCESSING METHOD, AND STORAGE MEDIUM FOR IMPROVED VISIBILITY IN 3D DISPLAY

(71) Applicant: CANON KABUSHIKI KAISHA, Tokyo (JP)

(72) Inventor: Taku Ogasawara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 91 days.

(21) Appl. No.: 17/021,790

(22) Filed: Sep. 15, 2020

(65) Prior Publication Data
US 2021/0082174 A1 Mar. 18, 2021

(30) Foreign Application Priority Data
Sep. 17, 2019 (JP) .............................. JP2019-168860

(51) Int. Cl.
*G06T 15/20* (2011.01)
*H04N 13/302* (2018.01)
*G06F 3/01* (2006.01)

(52) U.S. Cl.
CPC .............. *G06T 15/20* (2013.01); *G06F 3/011* (2013.01); *H04N 13/302* (2018.05)

(58) Field of Classification Search
CPC ........ G06T 15/20; H04N 13/302; G06F 3/011
See application file for complete search history.

(56) References Cited

U.S. PATENT DOCUMENTS

| 2013/0335405 | A1* | 12/2013 | Scavezze | ................ | A63F 13/61 345/419 |
| 2014/0132705 | A1* | 5/2014 | Kira | ..................... | H04N 13/111 348/36 |
| 2017/0115488 | A1* | 4/2017 | Ambrus | ............. | G02B 27/0172 |
| 2018/0315364 | A1* | 11/2018 | Yamamoto | ............. | G09G 5/026 |
| 2020/0005738 | A1* | 1/2020 | Ishii | ................... | G02B 27/0172 |
| 2020/0014901 | A1* | 1/2020 | Umemura | ............ | H04N 13/243 |

FOREIGN PATENT DOCUMENTS

| JP | 2011234142 A | * 11/2011 |
| JP | 5452801 B2 | 3/2014 |

* cited by examiner

*Primary Examiner* — Terrell M Robinson
(74) *Attorney, Agent, or Firm* — Canon U.S.A., Inc. IP Division

(57) ABSTRACT

An image processing apparatus acquires information about a three-dimensional display apparatus, acquires a plurality of images based on imaging by a plurality of imaging apparatuses that images a target area from different directions, sets a position of and a direction from a virtual viewpoint in a space associated with the target area, sets positions of and directions from virtual viewpoints of a number corresponding to a configuration of the three-dimensional display apparatus, with the position of and the direction from the virtual viewpoint as a reference, and generates display image data for the three-dimensional display apparatus, based on the plurality of images and the set positions of and the set directions from the virtual viewpoints.

19 Claims, 10 Drawing Sheets

FIG.3A
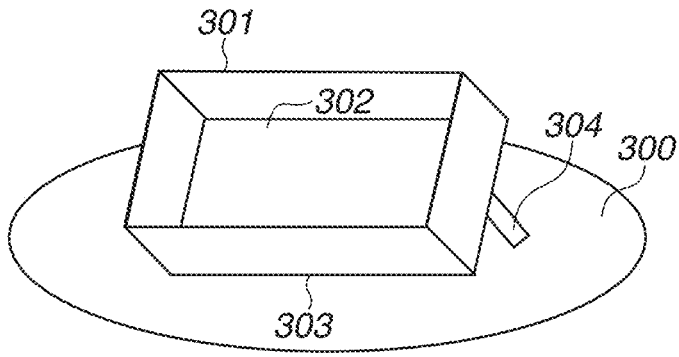
FIG.3B
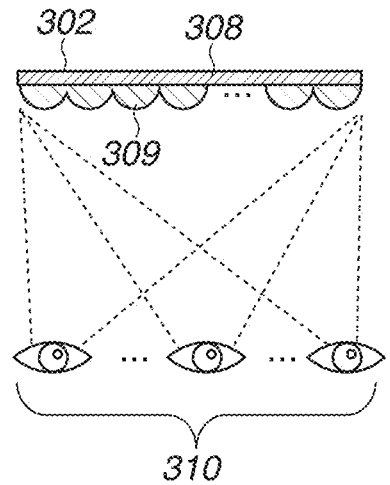
FIG.3C
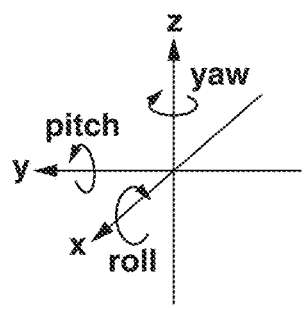
FIG.3D
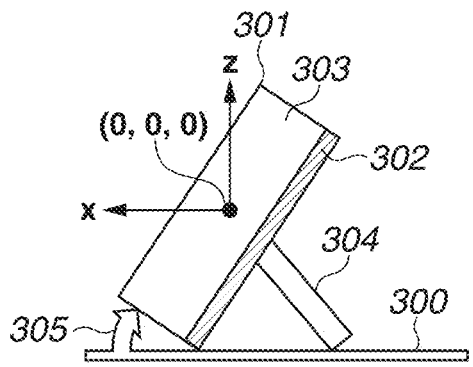
FIG.3E
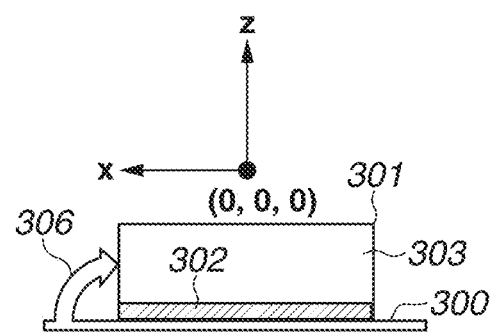
FIG.3F
| id | POSITION | | | ATTITUDE | | | LENS ARRAY INFORMATION |
|---|---|---|---|---|---|---|---|
|  | x | y | z | roll | pitch | yaw |  |
| 1 | 0 | 0 | 0 | 0 | pi1 | 0 | L1 |
| 2 | 0 | 0 | z2 | 0 | pi2 | 0 | L2 |

FIG.5A
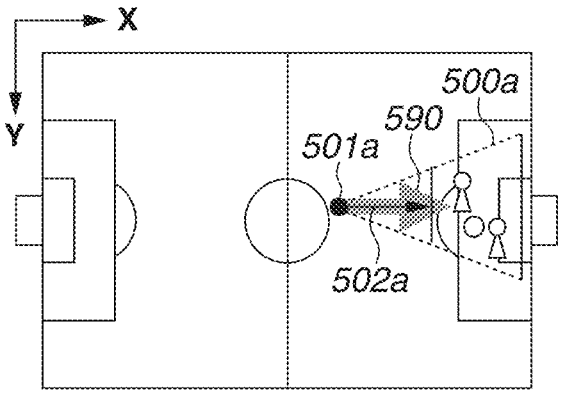
FIG.5B
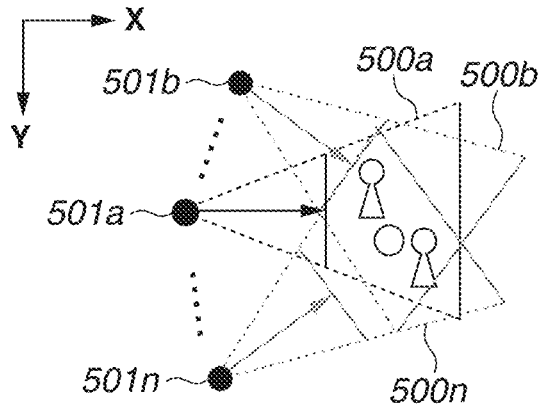
FIG.5C
| id | POSITION | | | ATTITUDE | | |
|---|---|---|---|---|---|---|
| | x | y | z | roll | pitch | yaw |
| a | x0 | y0 | z0 | ro0 | pi0 | ya0 |
FIG.5D
| id | POSITION | | | ATTITUDE | | |
|---|---|---|---|---|---|---|
| | x | y | z | roll | pitch | yaw |
| b | x1 | y1 | z1 | ro1 | pi1 | ya1 |
| c | x2 | y2 | z2 | ro2 | pi2 | ya2 |
| ... | ... | ... | ... | ... | ... | ... |
| n | xN | yN | zN | roN | piN | yaN |
FIG.5E
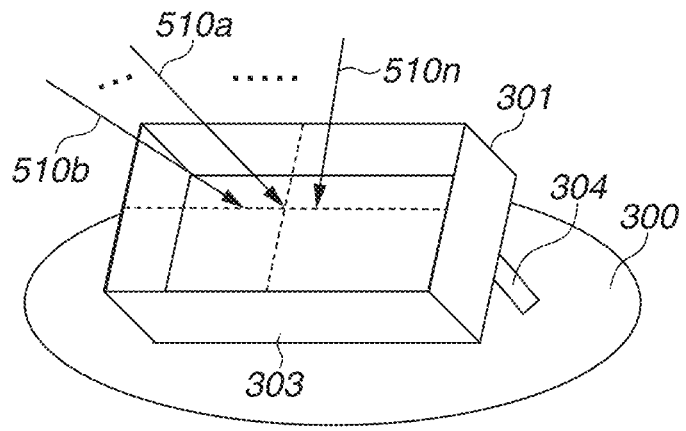

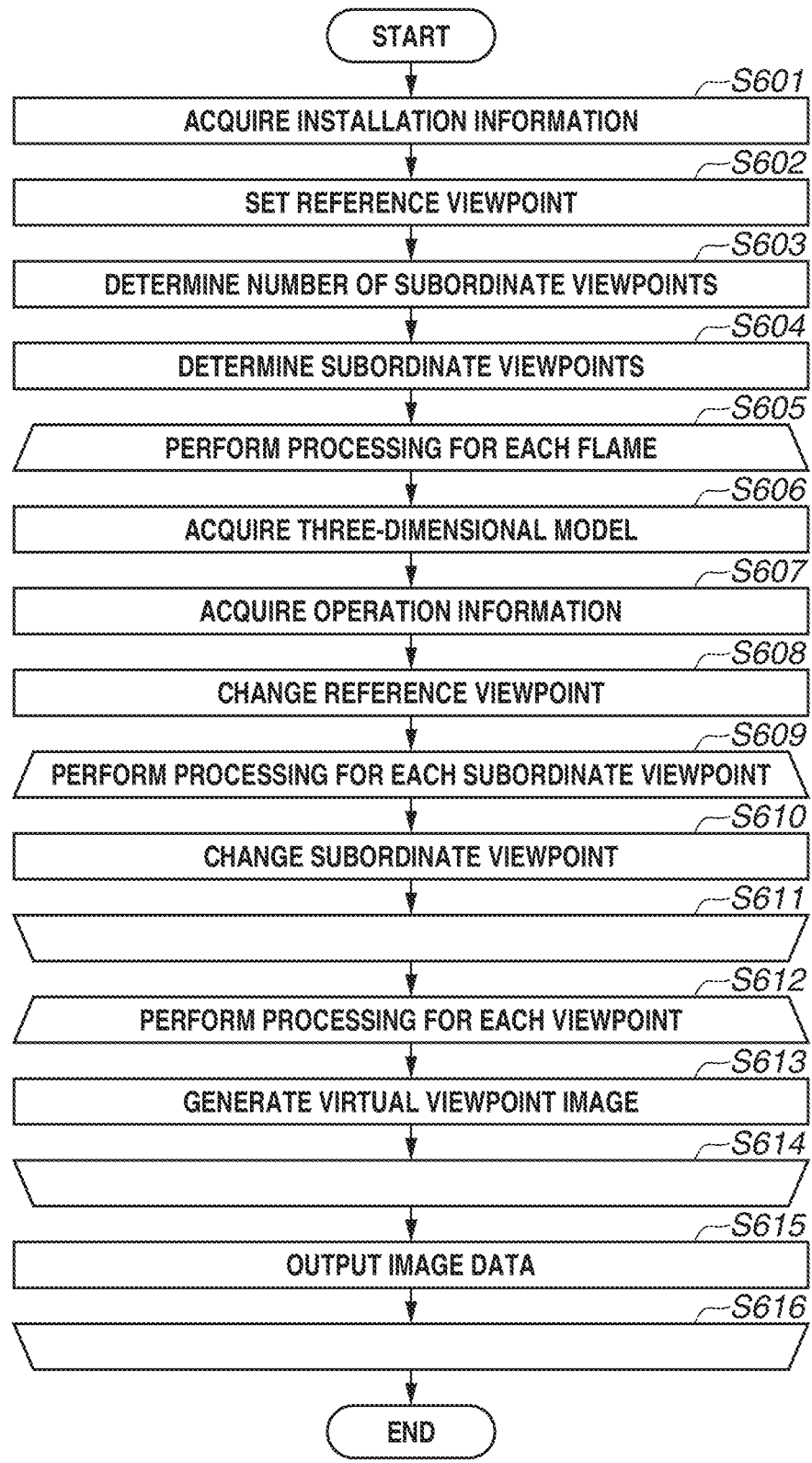

FIG.7A
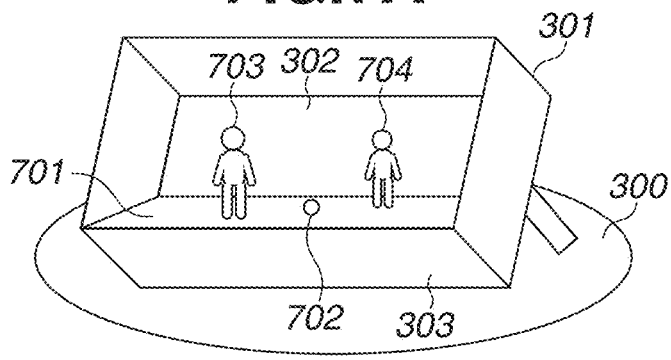
FIG.7B
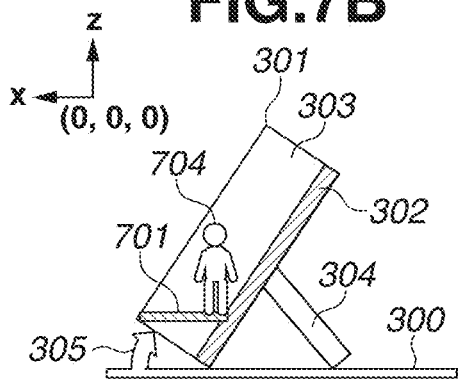
FIG.7C
| id | x | y | z | roll | pitch | yaw |
|---|---|---|---|---|---|---|
| 1 | on | off | off | off | off | off |
FIG.7D
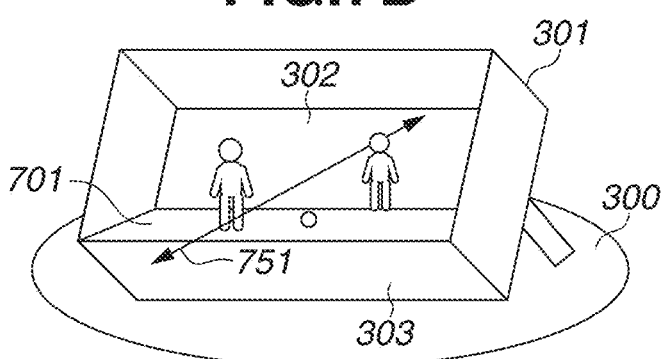
FIG.7E
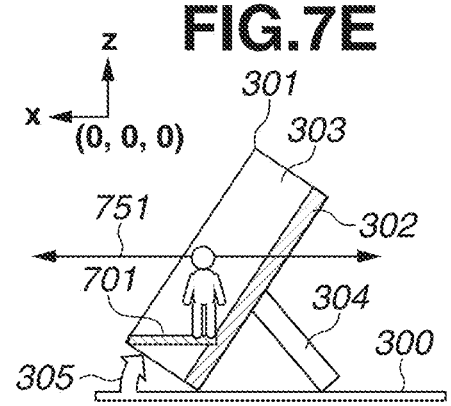
FIG.7F
| id | x | y | z | roll | pitch | yaw |
|---|---|---|---|---|---|---|
| 2 | on | on | off | off | off | on |
FIG.7G
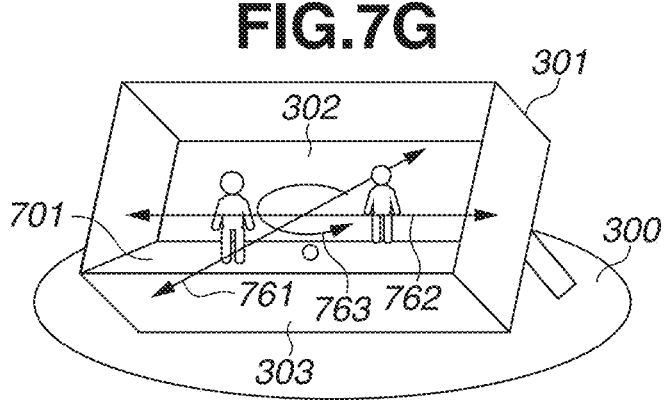

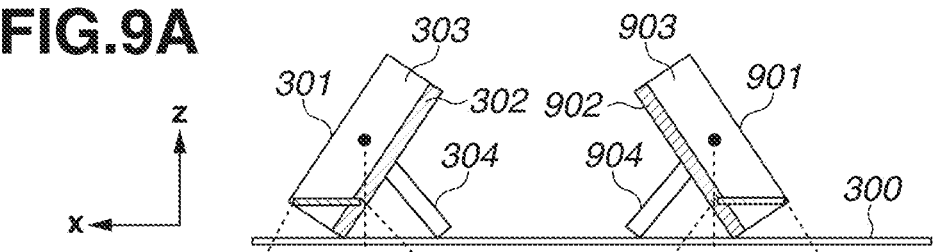
FIG.9A
FIG.9B
FIG.9C
| id | POSITION | | | ATTITUDE | | | POSITIONAL RELATIONSHIP | | | LENS ARRAY INFORMATION |
|---|---|---|---|---|---|---|---|---|---|---|
| | x | y | z | roll | pitch | yaw | x | y | z | |
| 1 | 0 | 0 | 0 | 0 | pi1 | 0 | 0 | 0 | 0 | L1 |
| 2 | x2 | 0 | 0 | 0 | pi2 | ya2 | x12 | 0 | 0 | L2 |
| ... | ... | ... | ... | ... | ... | ... | ... | ... | ... | ... |
| n | xn | yn | zn | ron | pin | Yan | x1n | y1n | z1n | Ln |
FIG.9D
| id | POSITION | | | ATTITUDE | | |
|---|---|---|---|---|---|---|
| | x | y | z | roll | pitch | yaw |
| 1 | 0 | 0 | 0 | 0 | 0 | 0 |
| 2 | x21 | 0 | 0 | 0 | 0 | ya21 |
| ... | ... | ... | ... | ... | ... | ... |
| n | x2N | y2N | z2N | ro2N | pi2N | ya2N |
FIG.9E
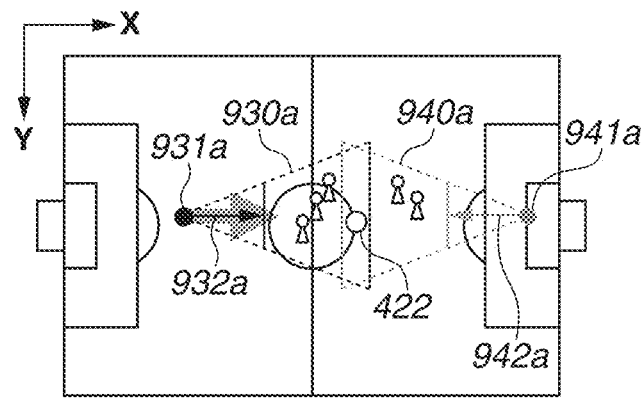

IMAGE PROCESSING APPARATUS, IMAGE PROCESSING METHOD, AND STORAGE MEDIUM FOR IMPROVED VISIBILITY IN 3D DISPLAY

BACKGROUND

Field

The present disclosure relates to a technology to display a three-dimensional image.

Description of the Related Art

As a display apparatus that displays a three-dimensional image, a naked-eye three-dimensional display that enables a user to view a natural three-dimensional image with naked eyes without necessity of dedicated glasses has been studied. Japanese Patent No. 5452801 discusses a three-dimensional display apparatus that realizes display of a three-dimensional image by presenting an image generated by capturing a display target three-dimensional shape model by a virtual camera to a user, and the user viewing it through a lens array. Further, Japanese Patent No. 5452801 discusses that the three-dimensional shape model is generated from images captured by imaging apparatuses arranged to surround a display target.

In a case where the three-dimensional image is displayed by using the three-dimensional display apparatus as in the technology discussed in Japanese Patent No. 5452801, it is desirable to further improve convenience for the user. For example, in a case where a three-dimensional image, the display target of which is a stadium where succor games, rugby matches, and the like are held, is displayed, when the user can designate the viewpoint position for viewing the stadium in the image to be three-dimensionally displayed, the user can view the image intended by the user. Further, for example, when a direction of the stadium to be three-dimensionally displayed and an attitude in installation of the three-dimensional display apparatus are matched, visibility of the three-dimensional image by the user is improved.

SUMMARY

According to an aspect of the present disclosure, an image processing apparatus includes a display information acquisition unit configured to acquire information about a three-dimensional display apparatus, the three-dimensional display apparatus displaying, to a user, different three-dimensional images corresponding to positions of eyes of the user to an image display plane by refracting, by a plurality of arranged lens elements included in a lens array, light entering the lens array from the image display plane, an image acquisition unit configured to acquire a plurality of images based on imaging by a plurality of imaging apparatuses that images a target area from different directions, a first setting unit configured to set a position of and a direction from a virtual viewpoint in a space associated with the target area, a second setting unit configured to set positions of and directions from a plurality of virtual viewpoints of a number corresponding to a configuration of the three-dimensional display apparatus, with the position of and the direction from the virtual viewpoint set by the first setting unit as a reference, and a generation unit configured to generate display image data for the three-dimensional display apparatus, based on the plurality of images acquired by the image acquisition unit and the positions of and the directions from the plurality of virtual viewpoints set by the first setting unit and the second setting unit.

Further features of the present disclosure will become apparent from the following description of exemplary embodiments with reference to the attached drawings.

BRIEF DESCRIPTION OF THE DRAWINGS

FIGS. 3A, 3B, 3C, 3D, 3E, and 3F are diagrams illustrating a three-dimensional display apparatus and installation information thereof.

FIGS. 5A, 5B, 5C, 5D, and 5E are diagrams illustrating a reference viewpoint and subordinate viewpoints.

FIG. 6 is a flowchart illustrating an example of operation by the image processing apparatus.

FIGS. 7A, 7B, 7C, 7D, 7E, 7F, and 7G are diagrams illustrating a display example of a three-dimensional image.

FIGS. 9A, 9B, 9C, 9D, and 9E are diagrams illustrating display by a plurality of three-dimensional display apparatuses.

DESCRIPTION OF THE EMBODIMENTS

Exemplary embodiments of the present disclosure are described below with reference to the attached drawings. The exemplary embodiments described below illustrate an example of a case where the present disclosure is specifically implemented, and the present disclosure is not limited to the exemplary embodiments described below.

[System Configuration]

Figure 1A:
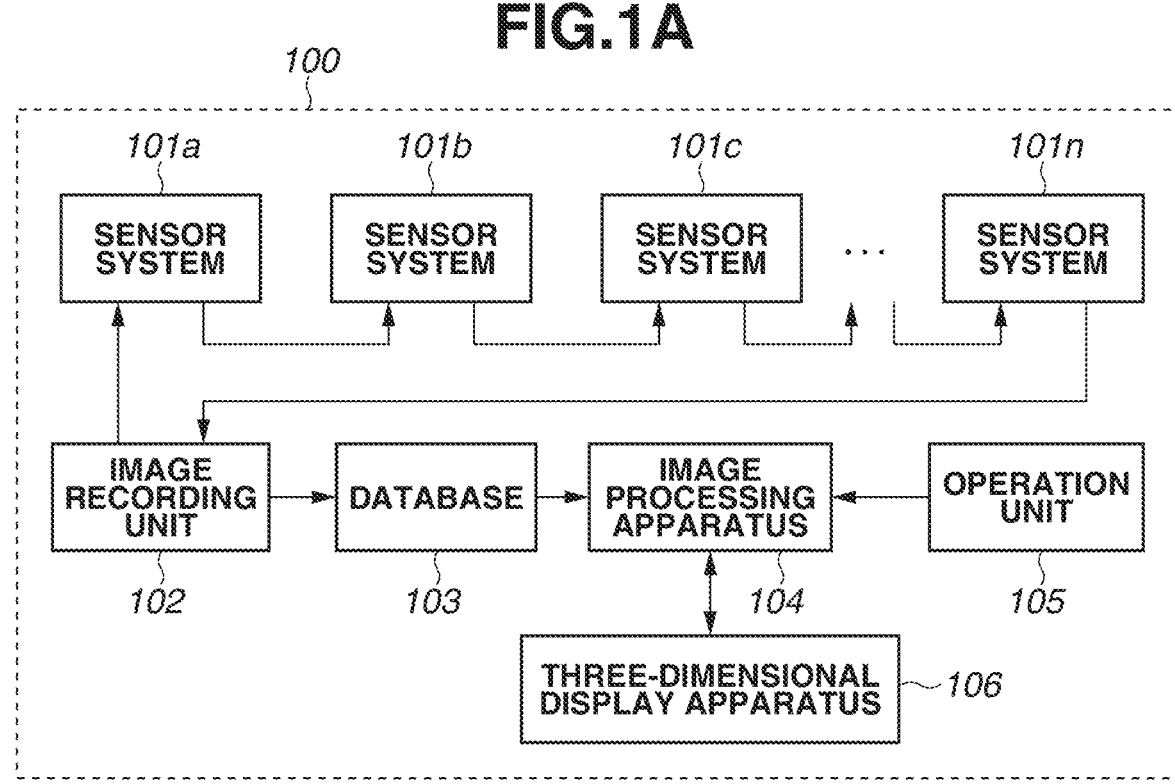
FIGS. 1A and 1B are diagrams illustrating a configuration example of an image processing system.
Figure 1B:
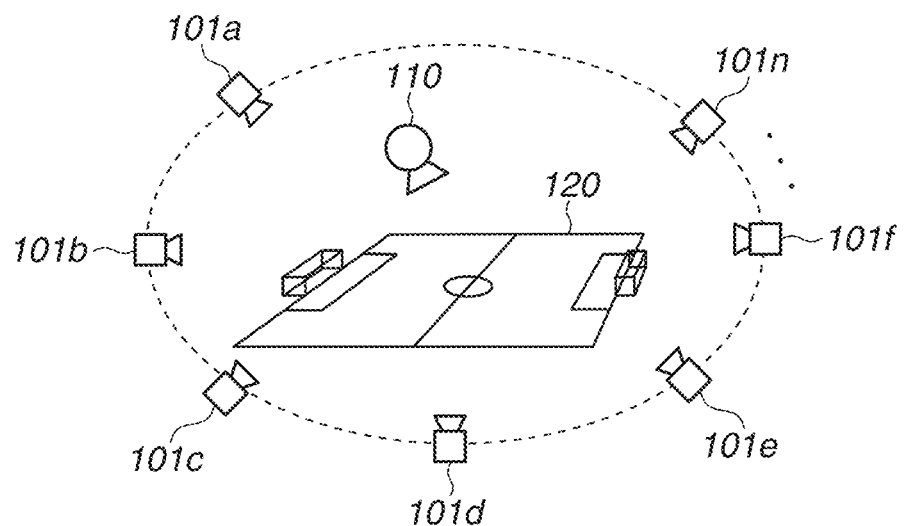

FIGS. 1A and 1B are diagrams illustrating a configuration of an image processing system 100 according to an exemplary embodiment. FIG. 1A is a block diagram illustrating a configuration example of the image processing system 100. The image processing system 100 includes n sensor systems 101a to 101n, and each of the sensor systems 101a to 101n includes at least one camera that is an imaging apparatus. In the following descriptions, the n sensor systems are referred to as sensor systems 101 without distinction, unless otherwise noted.

FIG. 1B is a diagram illustrating an installation example of the plurality of sensor systems 101. The plurality of sensor systems 101 is installed so as to surround an area 120 that is an imaging target area, and captures images of the area 120 from different directions. In the example of the present exemplary embodiment, the imaging target area 120 is a field of a stadium where soccer games are held, and the n (e.g., 30) sensor systems 101 are installed so as to surround the field. However, the number of the sensor systems 101 to be installed is not limited thereto. Further, the imaging target area 120 is not limited to the field of the stadium. The area 120 may also include seats in the stadium, and the area 120 may be an indoor studio, a stage, etc. Further, the sensor systems 101 may not be installed over an entire circumference of the area 120, and may be installed in only a part of the circumference of the area 120 depending on the restriction of an installation place. Further, the plurality of cameras included in the plurality of sensor systems 101 may include imaging apparatuses different in function, for example, a tele-camera and a wide-angle camera.

The plurality of cameras included in the plurality of sensor systems 101 performs imaging in synchronization with one another. A plurality of images obtained by imaging of the cameras is referred to as a plurality of viewpoint images. Each of the plurality of viewpoint images in the present exemplary embodiment may be a captured image or an image obtained by performing image processing such as processing to extract a predetermined area, on the captured image. An image recording unit 102 acquires the plurality of viewpoint images through image acquisition from the sensor systems 101, and stores the viewpoint images in a database 103.

Each of the sensor systems 101 may include a microphone (not illustrated) in addition to a camera. The microphones of the plurality of sensor systems 101 pick up sound in synchronization with each other. An acoustic sound that is reproduced together with display of an image on a three-dimensional display apparatus 106 can be generated based on the picked-up sound. In the following description, although description about the sound is omitted in order to simplify the description, the image and the sound are basically processed together.

An image processing apparatus 104 acquires the plurality of viewpoint images from the database 103, and acquires operation information from an operation unit 105. The operation information is information representing an input corresponding to user operation to the operation unit 105. Further, the image processing apparatus 104 acquires installation information on installation of the three-dimensional display apparatus 106. Thereafter, the image processing apparatus 104 sets a virtual viewpoint 110 based on the operation information and the installation information, and generates a virtual viewpoint image corresponding to the virtual viewpoint 110 based on the plurality of viewpoint images. The details of the installation information and the operation information are described below.

The virtual viewpoint image generated by the image processing apparatus 104 is an image representing a view from the designated virtual viewpoint 110. The virtual viewpoint in the present exemplary embodiment is also called a free viewpoint image. The virtual viewpoint image is not limited to the image corresponding to the viewpoint freely (optionally) designated by a user, and for example, an image corresponding to a viewpoint selected by the user from a plurality of candidates is also included in the virtual viewpoint image. Further, in the present exemplary embodiment, a case where the virtual viewpoint is designated based on user operation is mainly described; however, the virtual viewpoint may be automatically designated based on a result of image analysis or the like. In addition, in the present exemplary embodiment, a case where the virtual viewpoint image is a moving image is mainly described; however, the virtual viewpoint image may be a still image. The virtual viewpoint 110 is set in a virtual space associated with the area 120, and a user can view the area 120 from a viewpoint different from the viewpoints of the cameras in the plurality of sensor systems 101. The virtual viewpoint 110 is indicated by viewpoint information representing a position of and a direction from the virtual viewpoint in the virtual space. The viewpoint information may include information indicating a viewing angle and a focal length of the virtual viewpoint. Details of the viewpoint information are described below.

To realize display of a three-dimensional image by the three-dimensional display apparatus 106, the image processing apparatus 104 sets a plurality of virtual viewpoints, and generates virtual viewpoint images corresponding to the respective virtual viewpoints. More specifically, the image processing apparatus 104 determines one virtual viewpoint 110 as a reference based on the operation information and the installation information, and sets virtual viewpoints of the number corresponding to the configuration of the three-dimensional display apparatus 106 with the virtual viewpoint 110 as a reference. In the following descriptions, the virtual viewpoint 10 as a reference is referred to as a reference viewpoint, and the virtual viewpoints set based on the reference viewpoint are referred to as subordinate viewpoints. The details of the reference viewpoint and the subordinate viewpoints are described below.

Then, the image processing apparatus 104 combines the plurality of virtual viewpoint images generated from the plurality of viewpoint images based on the positions and the directions of the reference viewpoint and the subordinate viewpoints, thereby generating display image data for the three-dimensional display apparatus 106. The image processing apparatus 104 outputs the generated display image data to the three-dimensional display apparatus 106. The details of the processing performed by the image processing apparatus 104 are described below with reference to a flowchart.

The operation unit 105 receives operation by the user through, for example, a joystick, a touch panel, a keyboard, or a mouse, and outputs the operation information corresponding to the user operation to the image processing apparatus 104. The three-dimensional display apparatus 106 uses the image data acquired from the image processing apparatus 104 to display a three-dimensional image. The details of the configuration of the three-dimensional display apparatus 106 are described below.

The configuration of the image processing system 100 is not limited to the configuration illustrated in FIG. 1A. For example, a plurality of operation units 105 and a plurality of three-dimensional display apparatuses 106 may be connected to the image processing apparatus 104. Further, a plurality of image processing apparatuses 104 may be connected to the database 103.

[Configuration of Image Processing Apparatus]

Figure 2A:
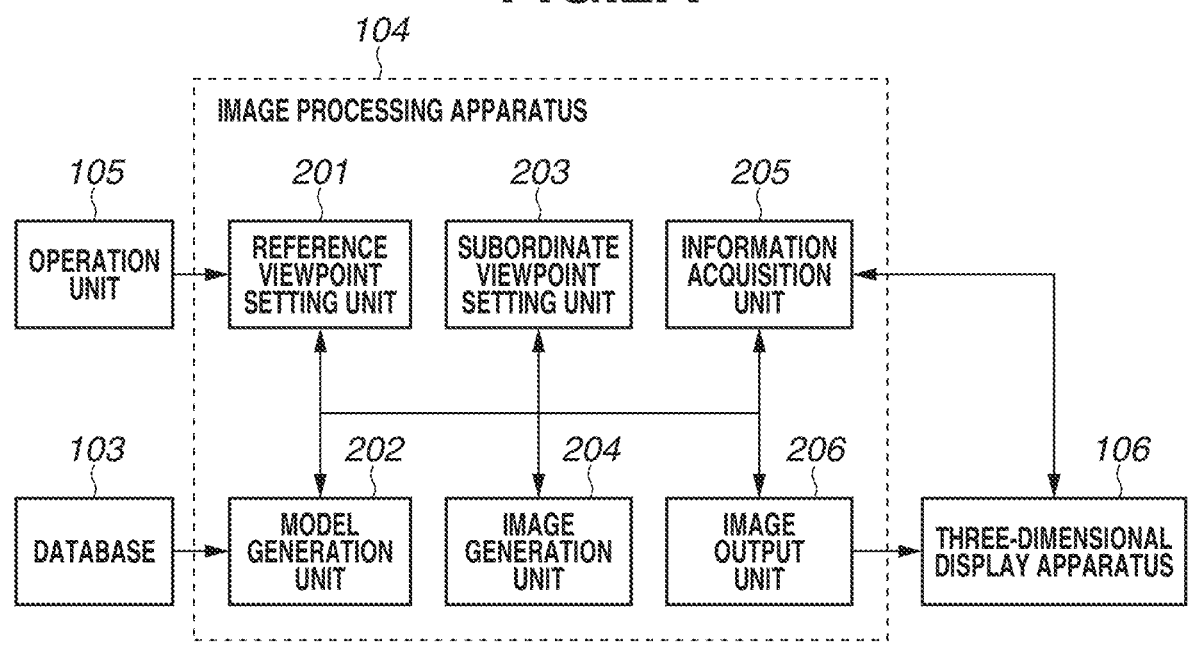
FIGS. 2A and 2B are block diagrams illustrating a configuration example of an image processing apparatus.
Figure 2B:
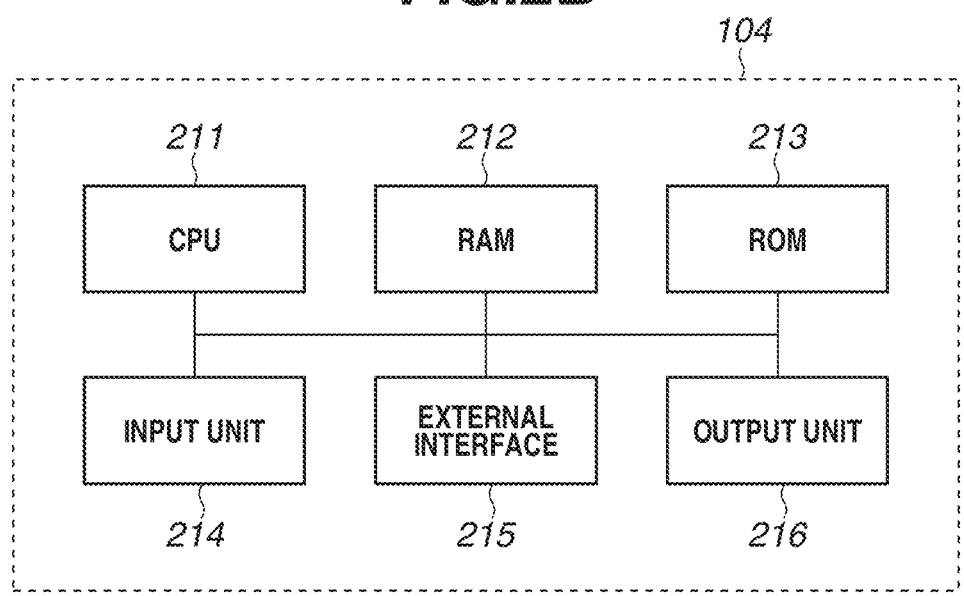

The configuration of the image processing apparatus 104 is described with reference to FIGS. 2A and 2B. FIG. 2A is a block diagram illustrating a functional configuration example of the image processing apparatus 104. The image processing apparatus 104 combines functions illustrated in FIG. 2A to generate the display image data for the three-dimensional display apparatus 106.

An information acquisition unit 205 acquires the installation information from the three-dimensional display apparatus 106, and manages the installation information. The details of the installation information are described below with reference to FIGS. 3A to 3F. The installation information includes, for example, information indicating a position (coordinates) and an attitude (rotation) at the installation time of the three-dimensional display apparatus 106. Further, the installation information may include information on a lens array configuring the three-dimensional display apparatus 106. A reference viewpoint setting unit 201 acquires from the operation unit 105 the operation information as an input corresponding to the user operation.

A model generation unit 202 generates a three-dimensional model that represents a three-dimensional shape of an object in the area 120, based on the plurality of viewpoint images acquired from the database 103. More specifically, foreground images that are each obtained by extracting a foreground area corresponding to a predetermined object such as a person and a ball, and background images that are each obtained by extracting a background area other than the foreground area are acquired from the plurality of viewpoint images. Then, the model generation unit 202 generates a foreground three-dimensional model based on the plurality of foreground images. The three-dimensional model is generated by a shape estimation method such as a visual hull, and includes point groups. The format of the three-dimensional shape data indicating the shape of the object is not limited thereto. A background three-dimensional model may be previously acquired by an external apparatus.

A subordinate viewpoint setting unit 203 sets the plurality of virtual viewpoints necessary for generating the display image data, based on the reference viewpoint. The reference viewpoint and the subordinate viewpoints are described below with reference to FIGS. 5A to 5E. An image generation unit 204 generates the virtual viewpoint images from the three-dimensional model based on the positions, the directions, the focal lengths, etc. of the reference viewpoint and the subordinate viewpoints. More specifically, the image generation unit 204 acquires an appropriate pixel value for each of the points configuring the three-dimensional model from the plurality of viewpoint images, and performs coloring processing. Further, the image generation unit 204 arranges the colored three-dimensional model in the three-dimensional virtual space, and performs projection to the virtual viewpoint. Then, the image generation unit 204 performs rendering to generate the virtual viewpoint images. The method of generating the virtual viewpoint images is not limited thereto, and various methods, for example, a method that generates the virtual viewpoint images by projective transformation of the captured images without using the three-dimensional model can be used. An image output unit 206 combines the plurality of virtual viewpoint images generated based on the plurality of virtual viewpoints to generate the display image data, and outputs the display image data to the three-dimensional display apparatus 106.

Note that the functional configuration of the image processing apparatus 104 is not limited to the functional configuration illustrated in FIG. 2A. For example, at least a part of the components of the image processing apparatus 104 illustrated in FIG. 2A may be mounted on the three-dimensional display apparatus 106 or any other apparatuses. Further, the image processing apparatus 104 and the three-dimensional display apparatus 106 may be integrally configured.

Next, a hardware configuration of the image processing apparatus 104 is described. FIG. 2B is a diagram illustrating a hardware configuration of the image processing apparatus 104. A central processing unit (CPU) 211 performs processing using programs and data stored in a random access memory (RAM) 212 and a read only memory (ROM) 213. The CPU 211 performs operation control of the entire image processing apparatus 104, and performs processing to implement the functions illustrated in FIG. 2A. The image processing apparatus 104 may include one or more of dedicated hardware different from the CPU 211, and the dedicated hardware may perform at least a part of the processing performed by the CPU 211. Examples of the dedicated hardware include an application specific integrated circuit (ASIC), a field programmable gate array (FPGA), and a digital signal processor (DSP).

The ROM 213 holds programs and data. The RAM 212 includes a work area that temporarily stores the programs and the data read out from the ROM 213. Further, the RAM 212 provides a work area used by the CPU 211 to perform each processing. An input unit 214 acquires, for example, information input from the operation unit 105. An external interface 215 performs transmission/reception of information with an external apparatus such as the database 103 and the three-dimensional display apparatus 106 by communication through, for example, a local area network (LAN). The output unit 216 outputs the image data to the three-dimensional display apparatus 106 through an image output port such as high-definition multimedia interface (HDMI®) and single document interface (SDI). The information output method by the output unit 216 is not limited thereto, and the image may be output by network transmission through Ethernet® or the like.

[Installation Information on Three-Dimensional Display Apparatus]

The configuration and the installation information on the three-dimensional display apparatus 106 are described with reference to FIGS. 3A, 3B, 3C, 3D, 3E, and 3F. FIG. 3A illustrates a state where a display apparatus 301 that is an example of the three-dimensional display apparatus 106 is placed on a table 300. The display apparatus 301 includes a projection plane 302, a transparent member 303 made of a high refractive index material such as glass and acrylic, and a supporting portion 304 that supports an attitude of the display apparatus 301.

FIG. 3B illustrates the projection plane 302 as viewed from above (from direction parallel to projection plane 302). The projection plane 302 includes a liquid crystal panel 308 on which an image is displayed, and a microlens array that includes a plurality of lens elements arranged two-dimensionally on the liquid crystal panel 308. The plurality of lens elements of the microlens array 309 may be configured to be separated from one another or may be configured to be integrated. The configuration of the display apparatus 301 is defined by parameters such as the number of lens elements, a lens pitch, and the number of pixels. As described below, the plurality of subordinate viewpoints necessary for displaying the three-dimensional image by the display apparatus 301 is determined based on the configuration of the display apparatus 301.

When light that enters the microlens array 309 from the liquid crystal panel 308 as an image display plane is refracted by the plurality of lens elements and the refracted light reaches eyes of a viewer 310, the viewer 310 can view different images depending on positions of the eyes to the image display plane. As a result, the display apparatus 301 can display the three-dimensional image to the viewer 310. In addition, when the viewer 310 moves the viewpoint position in vertical and horizontal directions, the viewer 310 can view the three-dimensional image shifted in the directions.

The configuration of the three-dimensional display apparatus 106 is not limited to the above-described example of the display apparatus 301 as long as the three-dimensional display apparatus 106 can display a three-dimensional image. For example, an organic electroluminescent (EL) panel may be used in place of the liquid crystal panel 308, and a lens array in which a plurality of lens elements is one-dimensionally arranged may be used in place of the microlens array 309. In addition, the installation place of the three-dimensional display apparatus 106 is not limited to a flat plane of the table 300 or the like as long as the three-dimensional display apparatus 106 is installable.

A coordinate system to represent the installation information on the display apparatus 301 is described with reference to FIG. 3C. As the coordinate system, an orthogonal coordinate system of a three-dimensional space including an X-axis, a Y-axis, and a Z-axis is used. Rotation around the X-axis is defined as "roll", rotation around the Y-axis is defined as "pitch", and rotation around the Z-axis is defined as "yaw". The position (coordinates) and the attitude (rotation) of the installed display apparatus 301 are expressed by such a coordinate system.

To simplify the description, the coordinate system is set in such a manner that the Z-axis is perpendicular to the flat plane of the table 300 and the Y-axis is parallel to the display surface. However, the setting of the coordinate system is not limited thereto.

An example of the installation information on the display apparatus 301 is described with reference to FIG. 3D to FIG. 3F. FIG. 3D illustrates the display apparatus 301 illustrated in FIG. 3A as viewed from a negative direction of the Y-axis. The display apparatus 301 in FIG. 3D is installed in such a manner that an origin (0, 0, 0) corresponds to a center position and the attitude is rotated (inclined) in the pitch direction. The installation information in a case where a magnitude of the rotation is defined as pi1 is illustrated in a row of (id=1) in FIG. 3F. The installation information is expressed by the position (x, y, z)=(0, 0, 0) and the attitude (roll, pitch, yaw)=(0, pi1, 0).

The position and the attitude at the installation time of the display apparatus 301 are not limited. For example, as illustrated in FIG. 3E, the display apparatus 301 may be installed in an attitude facing upward so that a perpendicular direction of the table 300 becomes the display direction. The installation information in this case is illustrated in a row of (id=2) in FIG. 3F. The installation information is expressed by the position (x, y, z)=(0, 0, z2) and the attitude (roll, pitch, yaw)=(0, pi2, 0).

The values of the position and the attitude in the installation information may be acquired by measurement, or may be acquired from a result of detection by a gyro sensor or a positioning device mounted on the three-dimensional display apparatus 106. Further, the installation information may include the above-described parameters relating to the projection plane 302 configuring the three-dimensional display apparatus 106. The above-described installation information is managed in an installation information management table illustrated in FIG. 3F, by the information acquisition unit 205. A plurality of pieces of installation information can be managed in the installation information management table.

[Position of and Direction from Virtual Viewpoint]

Figure 4A:
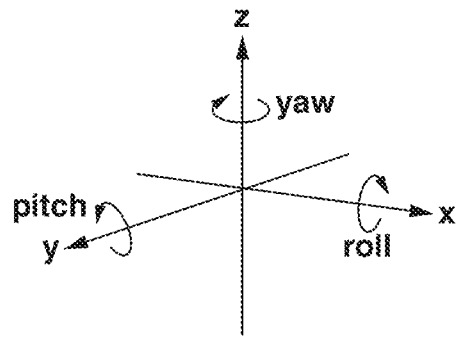
FIGS. 4A, 4B, 4C, and 4D are diagrams illustrating a virtual viewpoint.

The positions and the directions of the virtual viewpoints (reference viewpoint and subordinate viewpoints) are described with reference to FIGS. 4A, 4B, 4C, and 4D. The positions and the directions of the virtual viewpoints are expressed by one coordinate system. As illustrated in FIG. 4A, as a coordinate system, an orthogonal coordinate system of a three-dimensional space defined by an X-axis, a Y-axis, and a Z-axis is used. The coordinate system to express the virtual viewpoints illustrated in FIG. 4A and the coordinate system to represent the installation information illustrated in FIG. 3C are different from each other.

Figure 4B:
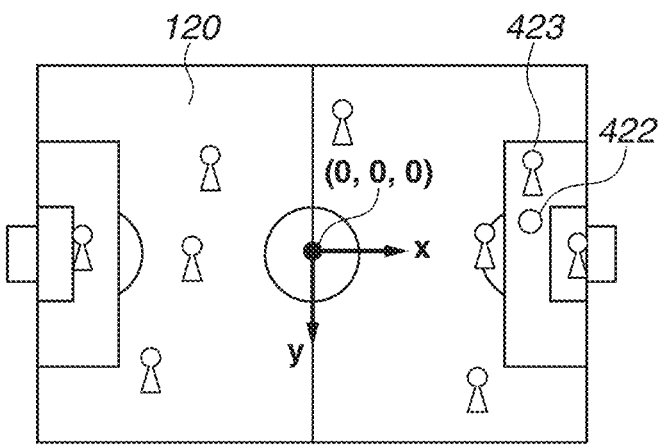

The coordinate system illustrated in FIG. 4A is set in association with the area 120 imaged by the sensor systems 101. The area 120 as an imaging target and an object located in the area 120 are both expressed by the coordinate system illustrated in FIG. 4A. For example, as illustrated in FIG. 4B, the imaging target includes the field of the stadium as the area 120, and a ball 422 and players 423 in the area 120. The imaging target may include sheets, or the like around the field.

To set the coordinate system associated with the field, for example, an origin (0, 0, 0) of the coordinate system is set at a center of the field. In addition, the coordinate system is set in such a manner that the X-axis corresponds to a long side direction of the field, the Y-axis corresponds to a short side direction of the field, and the Z-axis corresponds to a vertical direction to the field. The method of setting the coordinate system is not limited thereto.

Figure 4C:
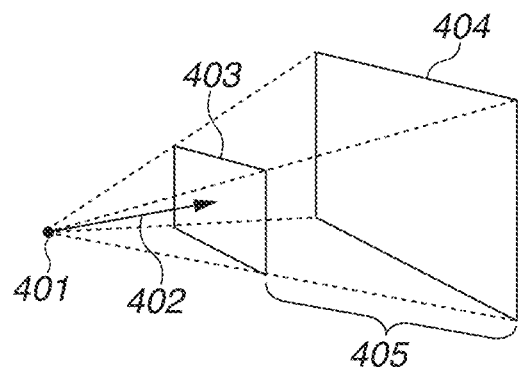
Figure 4D:
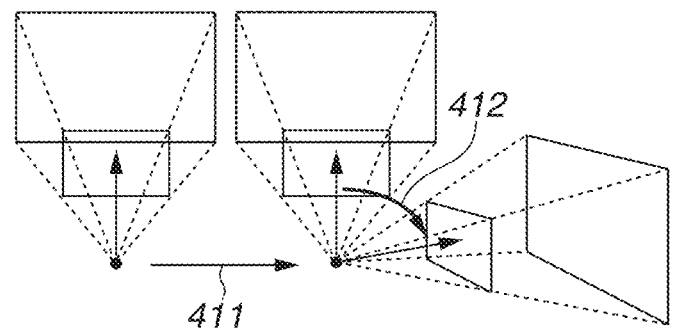

Next, a virtual viewpoint is described with reference to FIG. 4C and FIG. 4D. The virtual viewpoint is a viewpoint used to generate a virtual viewpoint image. In a quadrangular pyramid illustrated in FIG. 4C, a vertex represents a position 401 of the virtual viewpoint, and a vector extending from the vertex represents a direction 402 of the virtual viewpoint. The direction 402 of the virtual viewpoint is a viewing direction from the position 401 of the virtual viewpoint, and represents the direction, from the position 401 of the virtual viewpoint, in which the virtual viewpoint image to be generated is to be viewed. The position of the virtual viewpoint is expressed by the coordinates (x, y, z) of the three-dimensional space, and the direction is expressed by a unit vector having a component of each axis as a scalar.

The direction 402 of the virtual viewpoint passes through a center of each of a front clip surface 403 and a rear clip surface 404. A space 405 sandwiched between the front clip surface 403 and the rear clip surface 404 is referred to as a view-frustum of the virtual viewpoint, and a range inside the view-frustum of the three-dimensional space is a range to be displayed as the virtual viewpoint image.

Movement and rotation of the virtual viewpoint are described with reference to FIG. 4D. The virtual viewpoint is moved and rotated in the space expressed by the three-dimensional coordinates. Movement 411 of the virtual viewpoint is change in the position 401 of the virtual viewpoint, and is expressed by components (x, y, z) of the respective axes. Rotation 412 of the virtual viewpoint is change in the direction 402 of the virtual viewpoint, and is expressed by (yaw) that is rotation around the Z-axis, (pitch) that is rotation around the Y-axis, and (roll) that is rotation around the X-axis as illustrated in FIG. 4A. The virtual viewpoint image as if the area 120 is viewed from an optional position and an optional direction can be generated by moving and rotating the virtual viewpoint in the three-dimensional space associated with the area 120.

[Reference Viewpoint and Subordinate Viewpoint]

The reference viewpoint is described with reference to FIG. 5A and FIG. 5C. The reference viewpoint is a virtual viewpoint that is moved and rotated in the three-dimensional space associated with the area 120 based on the operation information input from the operation unit 105. The virtual viewpoint image generated by the image processing apparatus 104 is generated based on the plurality of viewpoint images captured by the plurality of cameras that set so as to surround the area 120. Accordingly, even when the area 120 to be imaged is a large scale area such as a field of soccer, rugby, etc., the reference viewpoint that is the virtual viewpoint corresponding to the virtual viewpoint image can be moved and rotated at an optional position in the area 120.

FIG. 5C illustrates an example of the viewpoint information. The viewpoint information represents the position (x, y, z) and the direction (roll, pitch, yaw) of the virtual viewpoint. The format of the viewpoint information is not limited thereto as long as the viewpoint information represents at least the position and the direction of the virtual viewpoint.

The viewpoint information may include information representing a focal length and a viewing angle of the virtual viewpoint. In other words, the virtual viewpoint represented by the viewpoint information is defined by the position, the direction, the viewing angle, and the like.

The operation information input from the operation unit 105 is information representing at least any one of a moving amount and a rotation amount of the virtual viewpoint corresponding to the user operation. For example, when the reference viewpoint is set to the origin and the operation information representing movement of the position of the virtual viewpoint by x0 in the X-axis direction is input, the reference viewpoint setting unit 201 generates viewpoint information representing the reference viewpoint with the position thereof having been changed to x0. Likewise, when the operation information representing rotation of the direction of the reference viewpoint is input, the reference viewpoint setting unit 201 generates viewpoint information representing the reference viewpoint with the direction thereof having been changed. The viewing angle or the focal length of the reference viewpoint may be changed in response to input of operation information representing zooming of the reference viewpoint.

Further, the operation information is not limited to information representing the moving amount and the rotation amount of the reference viewpoint, and may be information representing the position and the direction of the reference viewpoint designated by the user operation. In this case, the reference viewpoint setting unit 201 sets the reference viewpoint based on the position and the direction represented by the operation information. For example, FIG. 5A illustrates the area 120 as viewed from the Z-axis direction. In a case where operation information 590 designating the position and the direction of the viewpoint is input, the reference viewpoint setting unit 201 can set a position 501a to a position of a reference viewpoint 500a, and set a direction 502a to a direction of the reference viewpoint 500a based on the operation information.

Next, the subordinate viewpoints are described with reference to FIG. 5B, FIG. 5D, and FIG. 5E. As described with reference to FIGS. 3A to 3F, the image displayed by the three-dimensional display apparatus 106 includes the virtual viewpoint images corresponding to a plurality of viewing directions 510a to 510n so as to show the image corresponding to the position of the viewer 310 to the viewer 310. Accordingly, the image processing apparatus 104 generates the plurality of virtual viewpoint images corresponding to the positions and the directions of the plurality of set virtual viewpoints, based on the plurality of viewpoint images.

First, the virtual viewpoint image corresponding to the position and the direction of the reference viewpoint is associated with the viewing direction 510a for front view of the display apparatus 301. The other viewing directions 510b to 510n are associated with the virtual viewpoint images corresponding to the positions and the directions of the subordinate viewpoints that are set with the reference viewpoint as a reference. The number of subordinate viewpoints is determined based on the parameters representing the configuration of the display apparatus 301 described with reference to FIGS. 3A to 3F. For example, the subordinate viewpoint setting unit 203 sets the positions and the directions of the subordinate viewpoints of the number corresponding to the number of lens elements included in the lens array of the display apparatus 301. In a case where the lens array includes 45 lens elements arranged, one reference viewpoint and 44 subordinate viewpoints are set. However, the number of subordinate viewpoints may be less than the number of lens elements. The plurality of subordinate viewpoints set by the subordinate viewpoint setting unit 203 are different in at least any of position and direction from one another.

The viewing directions corresponding to the subordinate viewpoints may be arranged one-dimensionally or two-dimensionally. For example, when the viewer 310 moves in the horizontal direction with respect to the display apparatus 301, the image viewed by the viewer 310 is changed, whereas when the viewer 310 moves in the vertical direction with respect to the display apparatus 301, the image viewed by the viewer 310 may not be changed. Alternatively, when the viewer 310 moves in the horizontal direction or the vertical direction with respect to the display apparatus 301, the image viewed by the viewer 310 may be changed.

In the present exemplary embodiment, the position and the direction of each of the subordinate viewpoints are managed by an offset (adjustment amount) to the position and the direction of the reference viewpoint. FIG. 5D illustrates information representing each of the subordinate viewpoints. The subordinate viewpoint setting unit 203 sets the position and the direction of each of the plurality of subordinate viewpoints based on the offset illustrated in FIG. 5D with the position and the direction of the reference viewpoint as a reference. More specifically, the subordinate viewpoint setting unit 203 acquires from the reference viewpoint setting unit 201 the viewpoint information that represents the position and the direction of the reference viewpoint, and changes the value of the viewpoint information based on the offset to generate the viewpoint information representing the position and the direction of each of the subordinate viewpoints. The magnitude of the offset may be previously determined based on the configuration of the three-dimensional display apparatus 106, or may be changed in response to the user operation.

Next, relationship of the positions and the directions of the reference viewpoint and the subordinate viewpoints in the three-dimensional space is described with reference to FIG. 5B. FIG. 5B illustrates the vicinity of the reference viewpoint 500a (viewpoint defined by position 501a and direction 502a) in an enlarged manner. In FIG. 5B, the subordinate viewpoints 500b to 500n capture a target captured by the reference viewpoint (object included in view-frustum of reference viewpoint 500a) from different positions in different directions.

Although FIG. 5B illustrates the subordinate viewpoints that are set at the positions and the directions different from the position and the direction of the reference viewpoint as viewed from the Z-axis direction, the subordinate viewpoints that are different in position and direction from the reference viewpoint may be set as viewed from the X-axis direction or the Y-axis direction. The subordinate viewpoints maintain respective offsets for the position and the direction with respect to the reference viewpoint illustrated in FIG. 5D. In other words, the subordinate viewpoints are moved and rotated in conjunction with movement and rotation of the reference viewpoint. This makes it possible to maintain relationship between the reference viewpoint and the subordinate viewpoints even when the reference viewpoint is changed.

The above-described designation of the positions and the directions of the reference viewpoint and the subordinate viewpoints in the area (field) 120 to be imaged cannot be realized by the existing technology unless cameras are disposed and imaging is performed in the field. In the field sports such as soccer and rugby, it is difficult to arrange the cameras in the field. According to the present exemplary embodiment, however, the virtual viewpoint images can be generated using the reference viewpoint and the subordinate viewpoints at the positions and in the directions optionally designated in the field without such restriction, and image data obtained by combining the virtual viewpoint images can be output to the three-dimensional display apparatus 106.

Further, according to the present exemplary embodiment, an initial value of the direction of the reference viewpoint can be determined based on the installation information on the three-dimensional display apparatus 106. For example, in a case where the installation information on the display apparatus 301 illustrated in (id=1) in FIG. 3D is input to the image processing apparatus 104, the reference viewpoint setting unit 201 specifies the attitude (pitch=pi1) of the display apparatus 301 based on the installation information. In addition, the reference viewpoint setting unit 201 may generate viewpoint information that represents the direction of the viewpoint corresponding to the attitude of the display apparatus 301 as the initial value of the direction of the reference viewpoint. In this case, the field surface in the three-dimensional image displayed by the display apparatus 301 can be made parallel to the plane of the table 300, which makes it possible to perform display easily viewed by the viewer 310. The display example of the three-dimensional image in this case is described below with reference to FIG. 7A and FIG. 7B. The reference viewpoint may be set in such a manner that the field surface in the three-dimensional image has predetermined inclination. Further, in a case where the viewer 310 wants to change the direction of the three-dimensional image or the display target range, the direction of the reference viewpoint is changed from the initial value by operation through the operation unit 105. This enables the viewer 310 to view the three-dimensional image corresponding to a desired viewpoint.

[Processing to Generate Image Data]

The processing to generate the display image data to be output to the three-dimensional display apparatus 106 is described with reference to FIG. 6 and FIGS. 7A, 7B, 7C, 7D, 7E, 7F, and 7G. FIG. 6 is a flowchart illustrating operation by the image processing apparatus 104.

The processing illustrated in FIG. 6 is implemented when the CPU 211 of the image processing apparatus 104 loads programs stored in the ROM 213 to the RAM 212, and executes the programs. At least a part of the processing illustrated in FIG. 6 may be implemented by one or a plurality of dedicated hardware different from the CPU 211. The processing illustrated in FIG. 6 is started at a timing when the image processing apparatus 104 and the three-dimensional display apparatus 106 are connected, and an instruction to perform processing relating to generation of the virtual viewpoint image is input to the image processing apparatus 104. However, the start timing of the processing illustrated in FIG. 6 is not limited thereto. In the following description to be made with reference to FIG. 6, a three-dimensional moving image is generated based on the plurality of viewpoint images of a moving image including a plurality of frames previously stored in the database 103. However, the three-dimensional moving image may be generated in real time in parallel with acquisition of the plurality of viewpoint images. Further, a three-dimensional still image may be generated.

In step S601, the information acquisition unit 205 acquires the installation information from the three-dimensional display apparatus 106. In step S602, the reference viewpoint setting unit 201 sets the reference viewpoint by determining initial values of the position and the direction of the reference viewpoint based on the installation information acquired in step S601. In step S603, the subordinate viewpoint setting unit 203 determines the number of virtual viewpoints (number of subordinate viewpoints) set the reference viewpoint as a reference, based on the parameters representing the configuration of the three-dimensional display apparatus 106 included in the installation information acquired in step S601. In step S604, the subordinate viewpoint setting unit 203 determines initial values of the positions and the directions of the subordinate viewpoints based on the installation information acquired in step S601 and the position and the direction of the reference viewpoint determined in step S602. The initial values of the positions and the directions of the subordinate viewpoints are determined by applying offsets corresponding to the respective subordinate viewpoints to the initial values of the position and the direction of the reference viewpoint. In this way, the plurality of subordinate viewpoints with the reference viewpoint as a reference are set.

Processing in steps S605 to S616 is repeated for each of the moving image frames. In step S606, the model generation unit 202 generates and acquires a three-dimensional model based on the plurality of viewpoint images. In step S607, the reference viewpoint setting unit 201 receives the operation information input from the operation unit 105. In step S608, the reference viewpoint setting unit 201 sets the reference viewpoint changed (moved or rotated) based on the operation information acquired in step S607.

Processing in steps S609 to S611 is repeated for each of the subordinate viewpoints set in step S604. In step S610, the subordinate viewpoint setting unit 203 sets the subordinate viewpoints changed (moved or rotated) based on a changing amount of the reference viewpoint in step S608 and the offsets of the respective subordinate viewpoints.

Processing in steps S612 to S614 is repeated for each of the virtual viewpoints (reference viewpoint and subordinate viewpoints). In step S613, the image generation unit 204 generates the virtual viewpoint image corresponding to each of the set virtual viewpoints. In step S615, the image output unit 206 combines the plurality of virtual viewpoint images generated in step S613 to generate image data, and outputs the image data to the three-dimensional display apparatus 106.

In the present exemplary embodiment, in generation of the image data by the image processing apparatus 104, the plurality of virtual viewpoint images corresponding to the plurality of virtual viewpoints are generated, and the virtual viewpoint images are then combined. However, the method of generating the image data is not limited thereto. For example, the image processing apparatus 104 specifies a virtual viewpoint corresponding to each of pixels in the image data among the plurality of virtual viewpoints, and may determine the value of each of the pixels by using pixel values extracted from the plurality of viewpoint images based on the specified virtual viewpoint.

The acquisition of the installation information in step S601 may be performed for each of the moving image frames. With this operation, in a case where the attitude or the like of the three-dimensional display apparatus 106 is changed during display of the three-dimensional image, the direction of the reference viewpoint can be changed based on the change of the attitude or the like, and the display range in the three-dimensional image can be changed.

The flowchart in FIG. 6 illustrates an example of the operation by the image processing apparatus 104, and the operation by the image processing apparatus 104 is not limited thereto. For example, the image processing apparatus 104 may set the initial values of the reference viewpoint and the subordinate viewpoints to predetermined default values or values designated in response to the user operation. In this case, the image processing apparatus 104 may not perform the processing in step S601. Further, for example, the image processing apparatus 104 may not acquire the operation information in step S607. In other words, the reference viewpoint and the subordinate viewpoints may be set based on the installation information, or the like on the three-dimensional display apparatus irrespective of the user operation. Further, for example, the image processing apparatus 104 may acquire from the other apparatus the viewpoint information representing the position and the direction of the reference viewpoint.

[Display Example of Three-Dimensional Image]

FIGS. 7A and 7B illustrate an example of the three-dimensional image that is displayed by the three-dimensional display apparatus 106 using the image data output by the processing illustrated in FIG. 6. FIG. 7A illustrates a state where the three-dimensional image is displayed on the display apparatus 301 illustrated in FIG. 3A. FIG. 7B illustrates the state in FIG. 7A as viewed from the Y-axis direction (from side). As described with reference to FIGS. 3A, 3B, 3C, 3D, 3E, 3F, and 3G, in the display apparatus 301, the actual image is displayed on the liquid crystal panel 308; however, the viewer 310 can view the three-dimensional image in which three-dimensional objects are present in the space of the transparent member 303 through the microlens array 309 disposed on the liquid crystal panel 308. In FIGS. 7A to 7G, the three-dimensional image perceived by the viewer 310 is schematically illustrated.

In FIG. 7A, a field 701, a ball 702, a player 703, and a player 704 are three-dimensionally displayed. In this display example, as described with reference to FIGS. 5A to 5E, the direction of the reference viewpoint is determined based on the attitude (inclination) in the installation information, and the three-dimensional image in which the plane of the table 300 and a plane of the field 701 are parallel to each other is accordingly displayed. In other words, a magnitude of an angle formed by a straight line (viewing direction) parallel to the direction of the reference viewpoint and the plane of the field 701 that is a reference plane in the space is equal to a magnitude of an angle formed by a normal of the projection plane 302 of the display apparatus 301 and the plane of the table 300 that is a horizontal plane. Likewise, the ball 702, the player 703, and the player 704 on the field 701 are also displayed so as to stand on the plane parallel to the table 300. For example, in a case where the imaging target is a field sport such as soccer and rugby, the three-dimensional image easily viewed is displayed on the display apparatus 301 placed on the table 300 by the display in the above-described manner, which enables the viewer 310 to further enjoy sport watching.

As described above, the positions and the directions of the virtual viewpoints in the space associated with the imaging target area 120 are set based on the installation information on the three-dimensional display apparatus 106, and the three-dimensional image corresponding to the installation situation of the three-dimensional display apparatus 106 can be displayed. Further, when the positions and the directions of the virtual viewpoints are changeable by a triaxial controller or the like, the user can display the three-dimensional image corresponding to a desired viewpoint on the three-dimensional display apparatus 106 without performing fine operation requiring proficiency.

[Restriction of Operation]

In the following description, an example of a case where the image data corresponding to the reference viewpoint and the subordinate viewpoints is output while restricting the change of the reference viewpoint by the user operation based on the installation information on the three-dimensional display apparatus 106, is described.

Restriction information to restrict change of the reference viewpoint by the user operation is described with reference to FIG. 7C. As illustrated in FIG. 7C, the restriction information indicates whether to enable (on) or disable (off) change of each of the parameters in the viewpoint information illustrated in FIG. 5C. The parameter that is disabled (off) in the restriction information is restricted in change based on the operation information. In the example illustrated in FIG. 7C, the items of the position (y, z) and the attitude (roll, pitch, yaw) are disabled, and only the item of the position (x) is enabled. In this case, the reference viewpoint is movable only in the X-axis direction in response to the user operation.

A value of an identifier (id) in the restriction information corresponds to the identifier (id) in the installation information, and is managed as the restriction information with respect to the corresponding three-dimensional display apparatus 106. In other words, in a case where the image processing system 100 includes a plurality of three-dimensional display apparatuses 106, the restriction information different for each of the three-dimensional display apparatuses 106 may be set.

The image processing apparatus 104 may switch whether to restrict change of the reference viewpoint based on the restriction information, in response to the user operation. In this case, the image processing apparatus 104 receives an input about switching operation from the operation unit 105, and the reference viewpoint setting unit 201 determines whether to perform restriction on setting of the reference viewpoint. For example, the reference viewpoint setting unit 201 may determine whether to restrict change of the direction of the reference viewpoint in response to the user operation, to change in a predetermined direction, based on whether predetermined operation has been performed on the operation unit 105. The switching operation may be received by the three-dimensional display apparatus 106.

Figure 8:
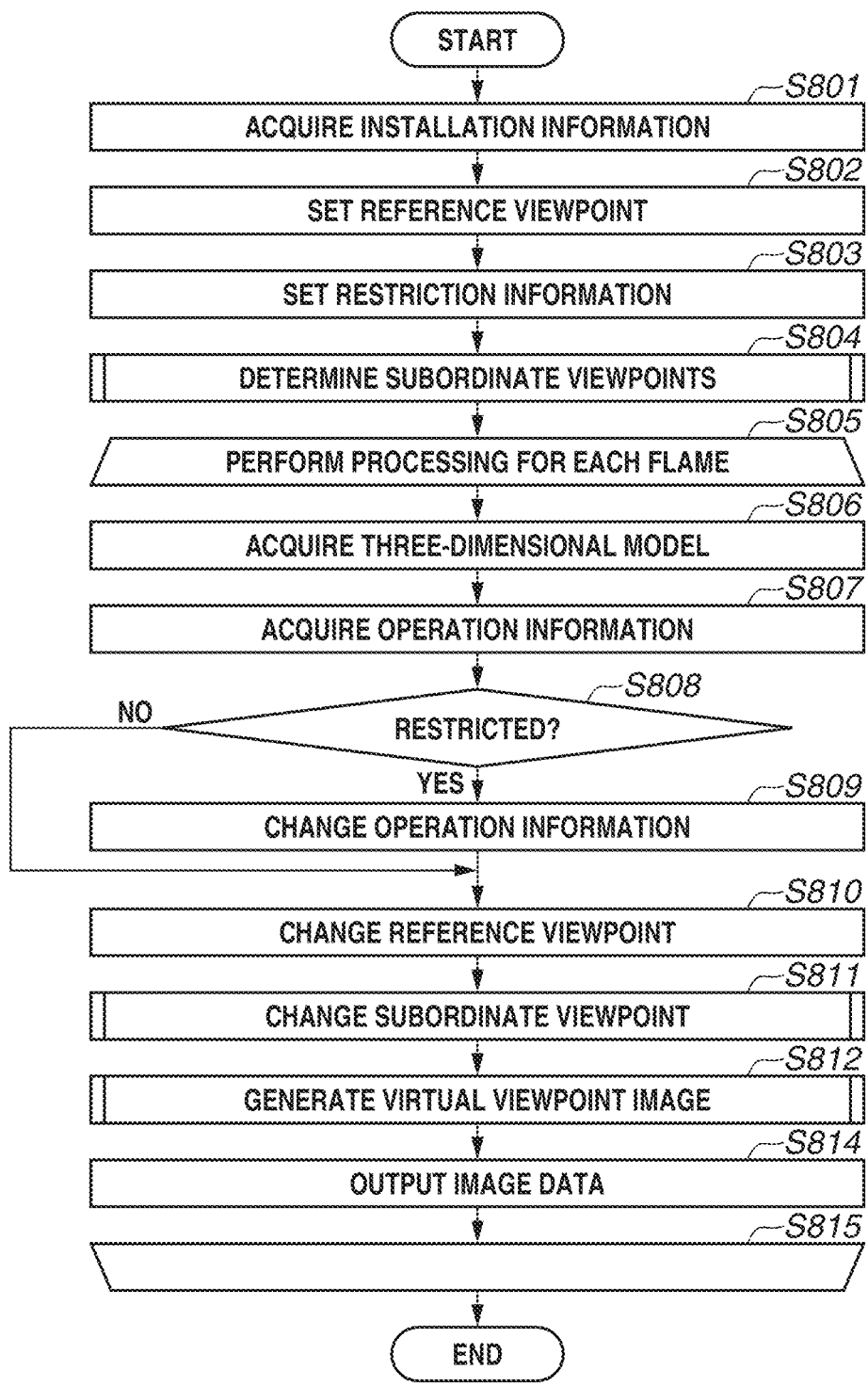
FIG. 8 is a flowchart illustrating an example of the operation by the image processing apparatus.

The operation by the image processing apparatus 104 in a case where the operation is restricted is described with reference to FIG. 8. In the following description, differences with the processing described with reference to FIG. 6 are mainly described. In step S801, the information acquisition unit 205 acquires the installation information. In step S802, the reference viewpoint setting unit 201 sets the reference viewpoint based on the installation information.

In step S803, the reference viewpoint setting unit 201 sets the restriction information. To set the restriction information, for example, an input unit such as buttons to set restriction to the parameters in the viewpoint information may be provided in the three-dimensional display apparatus 106 or the operation unit 105. Then, the reference viewpoint setting unit 201 may receive an input by the user operation to the input unit, and set the restriction information. Alternatively, for example, the reference viewpoint setting unit 201 may set the restriction information based on the initial values, and the like of the position and the direction of the reference viewpoint. In step S804, as in steps S603 and S604, the subordinate viewpoints are set based on the reference viewpoint and the configuration of the three-dimensional display apparatus 106.

Processing in steps S805 to S815 is repeated for each of the moving image frames. In step S806, the model generation unit 202 acquires the three-dimensional model. In step S807, the reference viewpoint setting unit 201 receives the operation information. In step S808, the reference viewpoint setting unit 201 determines whether each of the parameters in the viewpoint information has been restricted by the restriction information. The determination is performed on each of the parameters. In a case of a restricted parameter (change of which is disabled) (YES in step S809), the processing proceeds to step S809, and the reference viewpoint setting unit 201 disables the information corresponding to the parameter, in the operation information. On the other hand, in a case of an unrestricted parameter (change of which is enabled) (NO in step S808), the processing proceeds to step S810 without change of the operation information. Since each of the subordinate viewpoints is set based on the offset to the reference viewpoint, change of the item same as the item, change of which is disabled, in the reference viewpoint is also disabled in each of the subordinate viewpoints. In the example of FIG. 7C, the reference viewpoint and the subordinate viewpoints are all changed only in the position in the X-axis direction in response to the user operation, and the position in the other directions and the attitude are not changed in response to the user operation.

In step S810, the reference viewpoint setting unit 201 moves and rotates the reference viewpoint based on the operation information acquired in step S807 or changed in step S809. In step S811, as with the processing in steps S609 to S611, all of the subordinate viewpoints are changed based on the operation information. In step S812, as with the processing in steps S612 to S614, the virtual viewpoint images corresponding to the reference viewpoint and the subordinate viewpoints are generated. In step S814, the image output unit outputs image data that is generated by combining the plurality of virtual viewpoint images, to the three-dimensional display apparatus 106.

In the example of the restriction information illustrated in FIG. 7C, the reference viewpoint and the subordinate viewpoints are movable only in the X-axis direction (direction 751 in FIG. 7D) in response to the user operation. In other words, in the state where the field 701 is parallel to the table 300 in the three-dimensional image corresponding to the initial values of the reference viewpoint, the positions of the virtual viewpoints are moved only in the X-axis direction in response to the user operation while maintaining the parallel state of the field plane.

FIG. 7F illustrates another example of the restriction information. In the example of FIG. 7F, change in the position (z) and the attitude (roll, pitch) are disabled. In this case, only movement in the X-axis direction or the Y-axis direction, and rotation around the Z-axis (yaw rotation) are enabled. In the state where the field 701 is parallel to the table 300 in the three-dimensional image corresponding to the initial values of the reference viewpoint, the virtual viewpoints are moved in an X-axis direction 761 and a Y-axis direction 762 in response to the user operation while maintaining the parallel state and a height of the field plane as illustrated in FIG. 7G. Further, the virtual viewpoints are rotated in a yaw direction 763. The items that can be disabled by the restriction information and the combination thereof are not limited to the above-described examples.

According to the above-described method, for example, the virtual viewpoints can be moved and rotated while maintaining the parallel state between the field 701 in which the object is located and the plane of the table 300. In other words, the virtual viewpoints can be changed based on intention of the user while maintaining viewability of the three-dimensional image for the user. As a result, even in a case where the field sport such as soccer and rugby in which objects such as a ball and players frequently move in the field is the imaging target, it is possible to provide easily-viewable sport watching by the three-dimensional display apparatus 106.

As described above, the initial values of the virtual viewpoints can be set based on the installation information on the three-dimensional display apparatus 106, and specific change of the virtual viewpoints based on the operation information can be restricted. As a result, for example, even in a case where it is difficult to operate the operation unit 105 such as a triaxial controller in a specific axis direction, it is possible to prevent the virtual viewpoints from being changed in a direction not intended by the user.

[Display by Plurality of Three-Dimensional Display Apparatuses]

In the following description, an example of a case where the image processing system 100 includes the plurality of three-dimensional display apparatuses 106, and different three-dimensional images are displayed on the respective three-dimensional display apparatuses 106 is described. The plurality of three-dimensional display apparatuses 106 is connected to the image processing apparatus 104, and the image processing apparatus 104 outputs display image data to each of the three-dimensional display apparatuses 106.

FIG. 9A illustrates an example in which the display apparatus 301 and a display apparatus 901 as the plurality of three-dimensional display apparatuses 106 are installed on the table 300. In the example of FIG. 9A, the display apparatus 901 is installed back-to-back with the display apparatus 301 that is installed at the same position and in the same attitude as the position and in the attitude in the example of FIG. 3D. The display apparatus 901 has a configuration similar to the configuration of the display apparatus 301. However, the plurality of three-dimensional display apparatuses 106 that has different configurations may be connected to the image processing apparatus 104. In this case, the number of subordinate viewpoints used to generate the image data for one of the three-dimensional display apparatuses 106 may be different from the number of subordinate viewpoints used to generate the image data for the other of the three-dimensional display apparatuses 106.

Positional relationship 910 between the display apparatus 301 and the display apparatus 901 is expressed by an offset value that indicates a relative position of the display apparatus 901 with the position of the display apparatus 301 as a reference. In the example of FIG. 9A, the display apparatus 901 is placed at a position back-to-back (position different in X-axis direction) with the display apparatus 301 that is placed on the origin and is directed to the X-axis direction. Thus, the offset value indicating the positional relationship is $(x, y, z)=(x12, 0, 0)$. Such positional relationship between the plurality of three-dimensional display apparatuses 106 is managed in an installation information management table. Attitude relationship between the display apparatus 301 and the display apparatus 901, i.e., relative attitude of the display apparatus 901 to the attitude of the display apparatus 301 may be expressed in a manner similar to the positional relationship.

In the installation information management table in FIG. 9C, ids corresponding to the respective three-dimensional display apparatuses 106 are arranged in a vertical axis, and items are arranged in a horizontal axis. The items include the positional relationship in addition to the identifier (id), the position, the attitude, and the lens array information that are included in the installation information illustrated in FIG. 3F. The three-dimensional display apparatus 106 that has positional relationship of (x, y, z)=(0, 0, 0) becomes reference for the positional relationship. In the example of FIG. 9A, the display apparatus 301 is the reference three-dimensional display apparatus 106.

The items of the installation information representing the installation states of the plurality of three-dimensional display apparatuses 106 are not limited to the items described above. Further, the installation method of the plurality of three-dimensional display apparatuses 106 is not limited to the back-to-back installation of two apparatuses. For example, the three-dimensional display apparatuses 106 may be placed on respective sides of a square shape, or dozens of three-dimensional display apparatuses 106 may be arranged on a circumference of an ellipse. The installation information on each of the three-dimensional display apparatuses 106 is represented by an offset to the reference three-dimensional display apparatus 106 irrespective of the arrangement. The installation information on each of the three-dimensional display apparatuses 106 may be represented by an absolute value, and a plurality of reference three-dimensional display apparatuses 106 may be present.

Next, processing to set the offset of the reference viewpoint corresponding to each of the three-dimensional display apparatuses 106 based on the positional relationship and the attitude relationship represented by the installation information is described. The offset of the reference viewpoint is described with reference to FIG. 9D and FIG. 9E. In the above-described example of including one three-dimensional display apparatus 106, one reference viewpoint is operated by one operation unit 105, and one three-dimensional display apparatus 106 displays the three-dimensional image. On the other hand, in a case of including the plurality of three-dimensional display apparatuses 106, the reference viewpoint corresponding to one reference three-dimensional display apparatus 106 (hereinafter, base reference viewpoint) is operated by one operation unit 105. Further, the reference viewpoints of the other three-dimensional display apparatuses 106 are set based on the offset to the base reference viewpoint. In other words, the reference viewpoints corresponding to the respective three-dimensional display apparatuses 106 are changed in conjunction with one another in response to the user operation to change at least any one of the positions and the directions of the virtual viewpoints. Further, the plurality of subordinate viewpoints corresponding to the plurality of three-dimensional display apparatuses 106 are also changed in conjunction with one another.

In the example of the installation information (id=1, 2) in FIG. 9C, the state where the display apparatus 301 and the display apparatus 901 are arranged back-to-back with each other is illustrated. The offset of the reference viewpoint illustrated in FIG. 9D is set from the installation information. A row of id=1 in FIG. 9D represents the base reference viewpoint. Accordingly, all of the values are set to 0. In other words, the values are set to (x, y, z)=(0, 0, 0), and (roll, pitch, yaw)=(0, 0, 0).

A row of id=2 represents the offset of the reference viewpoint of the display apparatus 901 that is installed back-to-back with the display apparatus 301, and the values are set to (x, y, z)=(x21, 0, 0) and (roll, pitch, yaw)=(0, 0, ya21). The offset may be set in such a manner that viewfrustums of the two reference viewpoints are partially overlapped with each other. For example, in a case where the imaging target is a ball sport such as soccer and rugby, the offset may be set in such a manner that the ball 422 as a predetermined object is included in both of a display target range 950 of the display apparatus 301 and a display target range 960 of the display apparatus 901. The range 950 is included in a visual field of the virtual viewpoints corresponding to the display apparatus 301, and the range 960 is included in a visual field of the virtual viewpoints corresponding to the display apparatus 901.

FIG. 9E illustrates the field as viewed from the Z-axis direction (from above). In FIG. 9E, a position of a base reference viewpoint 930a is set to a coordinate 931a, and a direction thereof is set to a direction 932a. A position of a reference viewpoint 940a of id=2 is set to a coordinate 941a, and a direction thereof is set to a direction 942a. This corresponds to an example in which the offsets are set in such a manner that the reference viewpoint 930a and the reference viewpoint 940a corresponding to the respective three-dimensional display apparatuses 106 face each other based on the installation information in the case where the two three-dimensional display apparatuses 106 are installed back-to-back with each other as illustrated in FIG. 9A. In other words, a difference between the direction of the reference viewpoint 930a and the direction of the reference viewpoint 940a corresponds to a difference between a normal direction of the image display plane of the display apparatus 301 and a normal direction of the image display plane of the display apparatus 901.

For example, in the case where the imaging target is a field sport such as soccer and rugby, the game advances while players are divided into a home team (own team) and an away team (opponent team), and the reference viewpoint can be set based on an attack direction of each of the teams. The offsets of the reference viewpoints are not limited to the facing state, and are set based on the positional relationship included in the installation information on the plurality of three-dimensional display apparatuses 106.

The operation by the image processing apparatus 104 in a case where the three-dimensional images are displayed by the plurality of three-dimensional display apparatuses 106 is described with reference to FIG. 10. In the following description, differences with the processing described with reference to FIG. 6 are mainly described.

In step S1001, the information acquisition unit 205 acquires the installation information on the plurality of three-dimensional display apparatuses 106. In step S1002, the reference viewpoint setting unit 201 determines the installation information on the reference three-dimensional display apparatus 106 and the installation information on the other three-dimensional display apparatuses 106, out of the installation information acquired in step S1001. In a case of the installation information on the reference three-dimensional display apparatus 106 (YES in step S1002), the processing proceeds to step S1004 without performing any processing. In a case of the installation information on the other three-dimensional display apparatuses 106 (NO in step S1002), the processing proceeds to step S1003. In step S1003, the reference viewpoint setting unit 201 sets the offsets of the reference viewpoints corresponding to the respective three-dimensional display apparatuses 106 based on the positional relationship and the attitude relationship represented by the installation information on the three-dimensional display apparatuses 106.

In step S1004, the reference viewpoint setting unit 201 sets the reference viewpoints corresponding to the respective three-dimensional display apparatuses 106 based on the installation information and the offsets of the reference viewpoints, and generates and outputs the display image data for each of the three-dimensional display apparatuses 106. More specifically, the reference viewpoint setting unit 201 generates viewpoint information representing the base reference viewpoint, and viewpoint information representing the other reference viewpoints. The subordinate viewpoint setting unit 203 acquires these of the viewpoint information, sets a position and a direction of a virtual viewpoint group (subordinate viewpoint group) with the base reference viewpoint as a reference, and sets a position and a direction of a subordinate viewpoint group with the other reference viewpoints as a reference. Further, the image generation unit 204 generates the display image data for the reference three-dimensional display apparatus 106 based on the position and the direction of one of the subordinate viewpoint groups, and generates the display image data for the other three-dimensional display apparatuses 106 based on the position and the direction of the other subordinate viewpoint group.

Figure 10:
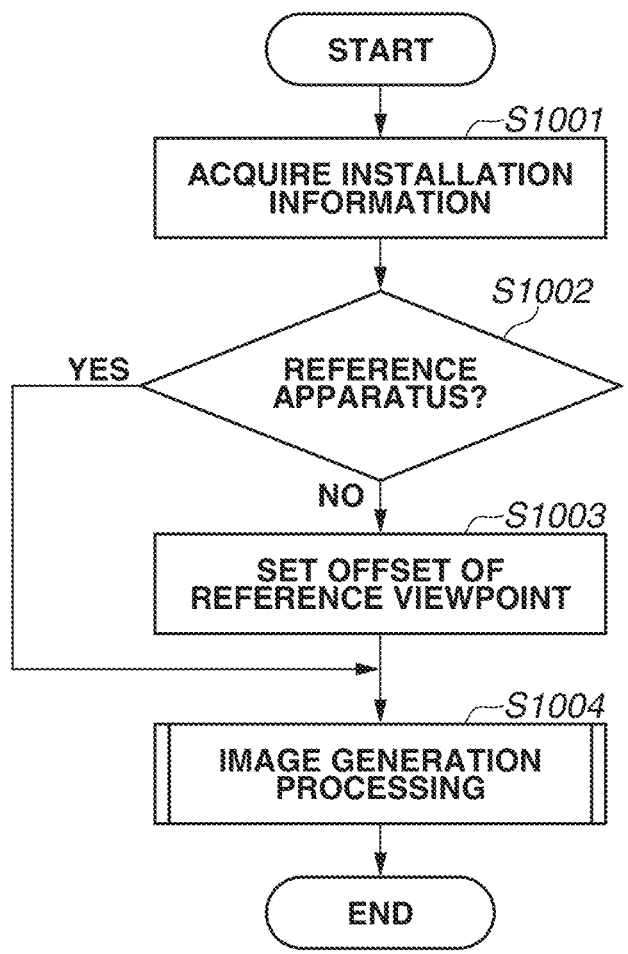
FIG. 10 is a flowchart illustrating an example of the operation by the image processing apparatus.

FIG. 9B illustrates an example of the displayed three-dimensional images in a case where the processing illustrated in FIG. 10 is performed using the installation information in FIG. 9C and the offsets of the reference viewpoints in FIG. 9D. The example of FIG. 9B illustrates a state where the three-dimensional image corresponding to the reference viewpoint 930a that has the range 950 as the display target is displayed by the display apparatus 301, and the three-dimensional image corresponding to the reference viewpoint 940a that has the range 960 as the display target is displayed by the display apparatus 901. The three-dimensional image displayed by the display apparatus 301 is an image corresponding to a viewpoint of a team that attacks in the X-axis positive direction in the field, and the three-dimensional image displayed by the display apparatus 901 is an image corresponding to a viewpoint of a team that attacks in the X-axis negative direction in the field. According to the above-described method, the viewer 310 can observe the state of the area 120 from a desired direction by the viewer 310 moving and changing which of the three-dimensional display apparatuses 106 to observe and from which directions to observe the three-dimensional display apparatus 106.

The case where the one image processing apparatus 104 generates the image data for the plurality of three-dimensional display apparatuses 106 has been mainly described above; however, the configuration is not limited thereto. The image processing system 100 may include a plurality of image processing apparatuses 104, and each of the image processing apparatuses 104 may generate the image data for the three-dimensional display apparatus 106 corresponding to the own apparatus. This makes it possible to distribute the loads of the processing to generate the image data.

In this case, each of the image processing apparatuses 104 that generates the image data for the three-dimensional display apparatus 106 different from the reference three-dimensional display apparatus 106 specifies the position and the direction of the reference viewpoint corresponding to the image to be displayed on the reference three-dimensional display apparatus 106. Further, each of the image processing apparatuses 104 sets the reference viewpoint for the three-dimensional display apparatus 106 corresponding to the own apparatus, based on the installation information representing relationship between the attitude of the three-dimensional display apparatus 106 corresponding to the own apparatus and the attitude of the reference three-dimensional display apparatus 106, and the position and the direction of the base reference viewpoint. The information on the base reference viewpoint is exchanged by, for example, communication among the plurality of image processing apparatuses 104.

The base reference viewpoint is not limited to the reference viewpoint set based on the operation information and the installation information, and may be set based on a position of a predetermined object in the imaging target area 120. For example, a positing device may be attached to the ball 422 in the field, and the image processing apparatus 104 may acquire object information that represents a detection result of the position of the ball 422 by the positioning device. Then, the reference viewpoint setting unit 201 may set the base reference viewpoint 930a based on the positional information on the ball 422. In addition, since the reference viewpoint setting unit 201 sets the other reference viewpoint 940a based on the offset to the base reference viewpoint 930a, the reference viewpoint 940a is also determined based on the positional information on the ball 422.

As described above, when the two three-dimensional images in which the viewpoints face to each other as illustrated in FIG. 9B and FIG. 9E are changed based on the positional information on the ball 422 while maintaining the offsets, it is possible to continuously display the ball 422 in both of the three-dimensional images. The reference viewpoint setting unit 201 may continuously maintain the reference viewpoint 940a determined based on the position of the ball 422, or may change the reference viewpoint 940a based on the operation information corresponding to the user operation in a manner similar to the above-described exemplary embodiment.

The information used for setting the reference viewpoint is not limited to the position of the predetermined object, and a direction of the predetermined object may be used. For example, the image processing apparatus 104 may acquire object information that indicates a position and a direction of a specific person in the field designated by the user operation, and generate the viewpoint information on the base reference viewpoint based on the position and the direction of the person. This makes it possible to display a three-dimensional image at a viewpoint of the person in the field or at a viewpoint viewing the back of the person. Such virtual viewpoint setting using the object information is applicable to the case of using one three-dimensional display apparatus 106.

As described above, based on the installation information including the positional relationship among the plurality of three-dimensional display apparatuses 106, the plurality of three-dimensional images reflecting the positional relationship can be output to each of the three-dimensional display apparatuses 106. For example, in the field sport such as soccer and rugby, the three-dimensional image following the ball in the viewpoint direction matched to the attack direction of each of the own team and the opponent team is displayed on the corresponding three-dimensional display apparatus 106, which enables a new style sport watching.

The above-described exemplary embodiment makes it possible to improve convenience for the user in the case where the three-dimensional image is displayed by the three-dimensional display apparatus.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2019-168860, filed Sep. 17, 2019, which is hereby incorporated by reference herein in its entirety.

What is claimed is:

1. An image processing apparatus comprising:
one or more memories storing instructions; and
one or more processor executing the instructions causing the information processing apparatus to function as:
a display information acquisition unit configured to acquire display attitude information about an attitude of the three-dimensional display apparatus, and display information about a configuration of a three-dimensional display apparatus, the three-dimensional display apparatus displaying, to a user, different three-dimensional images corresponding to positions of eyes of the user to an image display plane by refracting, by a plurality of arranged lens elements included in a lens array, light entering the lens array from the image display plane;
an obtaining unit configured to obtain shape data that is generated using a plurality of images based on imaging by a plurality of imaging apparatuses that images a target area from different directions and that represents a three dimensional shape of an object in the target area;
a first setting unit configured to set a position of and a direction from a virtual viewpoint in a space associated with the target area;
a second setting unit configured to set positions of and directions from a plurality of virtual viewpoints of a number corresponding to the configuration of the three-dimensional display apparatus, with the position of and the direction from the virtual viewpoint set by the first setting unit as a reference, and with the display attitude information as reference; and
a generation unit configured to generate display image data for the three-dimensional display apparatus, based on the shape data obtained by the obtaining unit and the positions of and the directions from the virtual viewpoints set by the first setting unit and the second setting unit.

2. The image processing apparatus according to claim 1, wherein the generation unit generates a plurality of virtual viewpoint images respectively corresponding to the positions of and the directions from the plurality of virtual viewpoints, based on the shape data, and generates the display image data by combining the plurality of virtual viewpoint images.

3. The image processing apparatus according to claim 2, wherein the obtaining unit generates the shape data.

4. The image processing apparatus according to claim 1, further comprising a reception unit configured to receive an input corresponding to a user operation to designate at least any one of a position of and a direction from a virtual viewpoint,
wherein the first setting unit sets the position of and the direction from the virtual viewpoint based on the input received by the reception unit.

5. The image processing apparatus according to claim 4, further comprising a determination unit configured to determine whether to restrict change corresponding to the user operation, of the direction from the virtual viewpoint set by the first setting unit, to change in a predetermined direction,
wherein the first setting unit sets the position of and the direction from the virtual viewpoint based on the input received by the reception unit and the determination by the determination unit.

6. The image processing apparatus according to claim 1, further comprising an object information acquisition unit configured to acquire object information that represents at least any one of a position and a direction of a predetermined object located in the target area,
wherein the first setting unit sets the position of and the direction from the virtual viewpoint based on the object information acquired by the object information acquisition unit.

7. The image processing apparatus according to claim 1, wherein a magnitude of an angle formed by a straight line parallel to the direction from the virtual viewpoint set by the first setting unit and a reference plane in the space corresponds to a magnitude of an angle formed by a normal of the image display plane of the three-dimensional display apparatus and a horizontal plane.

8. The image processing apparatus according to claim 1, further comprising a specification unit configured to specify a position of and a direction from a virtual viewpoint corresponding to an image displayed by another three-dimensional display apparatus,
wherein the first setting unit sets the position of and the direction from the virtual viewpoint based on a relationship between an attitude of the three-dimensional display apparatus and an attitude of the other three-dimensional display apparatus, and the position of and the direction from the virtual viewpoint specified by the specification unit.

9. The image processing apparatus according to claim 1, wherein the first setting unit sets a position of and a direction from a first virtual viewpoint and a position of and a direction from a second virtual viewpoint in the space,
wherein the second setting unit sets a position of and a direction from a first virtual viewpoint group including virtual viewpoints of a number corresponding to a configuration of a first three-dimensional display apparatus with the position of and the direction from the first virtual viewpoint as a reference, and sets a position of and a direction from a second virtual viewpoint group including virtual viewpoints of a number corresponding to a configuration of a second three-dimensional display apparatus with the position of and the direction from the second virtual viewpoint as a reference, and wherein the generation unit generates display image data for the first three-dimensional display apparatus based on the shape data and the position of and the direction from the first virtual viewpoint group, and generates display image data for the second three-dimensional display apparatus based on the shape data and the position of and the direction from the second virtual viewpoint group.

10. The image processing apparatus according to claim 9, wherein a difference between the direction from the first virtual viewpoint and the direction from the second virtual viewpoint corresponds to a difference between a normal direction of an image display plane of the first three-dimensional display apparatus and a normal direction of an image display plane of the second three-dimensional display apparatus.

11. The image processing apparatus according to claim 9, further comprising a reception unit configured to receive an input corresponding to a user operation to change at least any one of a position of and a direction from a virtual viewpoint,
wherein the position of and the direction from the first virtual viewpoint group and the position of and the direction from the second virtual viewpoint group are changed in conjunction with the input received by the reception unit.

12. The image processing apparatus according to claim 9, wherein a predetermined object located in the target area is included in both of a visual field corresponding to the virtual viewpoint included in the first virtual viewpoint group and a visual field corresponding to the virtual viewpoint included in the second virtual viewpoint group.

13. The image processing apparatus according to claim 1, wherein the second setting unit sets the positions of and the directions from the plurality of virtual viewpoints based on the position of and the direction from the virtual viewpoint set by the first setting unit, and an adjustment amount predetermined for each of the virtual viewpoints of the number corresponding to the configuration of the three-dimensional display apparatus.

14. The image processing apparatus according to claim 1, wherein the second setting unit sets the positions of and the directions from the plurality of virtual viewpoints of a number corresponding to number of the lens elements included in the three-dimensional display apparatus, and
wherein the plurality of virtual viewpoints set by the first setting unit and the second setting unit is different in at least any one of the position and the direction.

15. An image processing method comprising:
acquiring display attitude information about an attitude of the three-dimensional display apparatus, and display information about a configuration of a three-dimensional display apparatus, the three-dimensional display apparatus displaying, to a user, different three-dimensional images based on positions of eyes of the user to an image display plane by refracting, by a plurality of arranged lens elements included in a lens array, light entering the lens array from the image display plane;
obtaining shape data that is generated using a plurality of images based on imaging by a plurality of imaging apparatuses that images a target area from different directions and that represents a three dimensional shape of an object in the target area;
setting a position of and a direction from a reference virtual viewpoint in a space associated with the target area;
setting positions of and directions from subordinate virtual viewpoints of a number corresponding to the configuration of the three-dimensional display apparatus, with the set position of and the set direction from the reference virtual viewpoint as a reference, and with the display attitude information as reference; and
generating display image data for the three-dimensional display apparatus, based on the shape data obtained and the set positions of and the set directions from the virtual viewpoints including the reference virtual viewpoint and the subordinate virtual viewpoints.

16. The image processing method according to claim 15, wherein the generating the display image data includes generating a plurality of virtual viewpoint images corresponding to the positions of and the directions from the plurality of virtual viewpoints, based on the plurality of acquired images, and generating the display image data by combining the plurality of virtual viewpoint images.

17. The image processing method according to claim 15 further comprising receiving an input corresponding to a user operation to designate at least any one of a position and a direction of a virtual viewpoint,
wherein the position and the direction of the reference virtual viewpoint is set based on the received input.

18. The image processing method according to claim 15, further comprising specifying an attitude of the three-dimensional display apparatus,
wherein the direction of the reference virtual viewpoint is set based on the specified attitude of the three-dimensional display apparatus.

19. A non-transitory computer-readable storage medium storing a program for causing a computer to execute an image processing method, the method comprising:
acquiring display attitude information about an attitude of the three-dimensional display apparatus, and display information about a configuration of a three-dimensional display apparatus, the three-dimensional display apparatus displaying, to a user, different three-dimensional images based on positions of eyes of the user to an image display plane by refracting, by a plurality of arranged lens elements included in a lens array, light entering the lens array from the image display plane;
obtaining shape data that is generated using a plurality of images based on imaging by a plurality of imaging apparatuses that images a target area from different directions and that represents a three dimensional shape of an object in the target area;
setting a position of and a direction from a reference virtual viewpoint in a space associated with the target area;
setting positions of and directions from subordinate virtual viewpoints of a number corresponding to the configuration of the three-dimensional display apparatus, with the set position of and the set direction from the reference virtual viewpoint as a reference, and with the display attitude information as reference; and
generating display image data for the three-dimensional display apparatus, based on the shape data obtained and the set positions of and the set directions from the virtual viewpoints including the reference virtual viewpoint and the subordinate virtual viewpoints.

* * * * *